(No Model.) 2 Sheets—Sheet 1.

C. H. LOEW.
FILTERING APPARATUS.

No. 543,389. Patented July 23, 1895.

ATTEST
Richard B. Moser
G. S. Scharffer

INVENTOR
Charles H. Loew
H. F. Fisher.
BY
ATTORNEY (No Model.) 2 Sheets—Sheet 2.
C. H. LOEW.
FILTERING APPARATUS.
No. 543,389. Patented July 23, 1895.
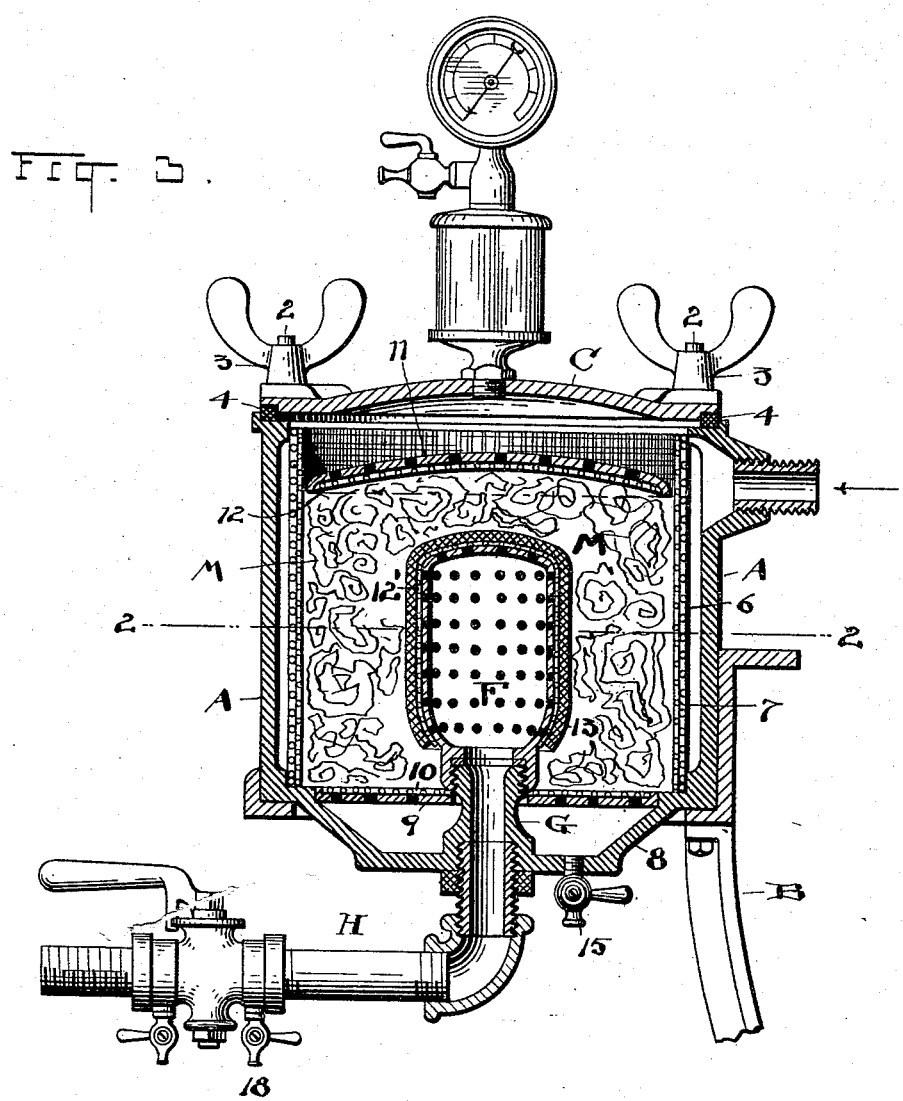
ATTEST
Richard D. Hoser
G. S. Scharffer
INVENTOR
Charles H. Loew
By H. J. Fisher
ATTORNEY

UNITED STATES PATENT OFFICE.

CHARLES H. LOEW, OF CLEVELAND, OHIO.

FILTERING APPARATUS.

SPECIFICATION forming part of Letters Patent No. 543,389, dated July 23, 1895.

Application filed December 21, 1894. Serial No. 532,605. (No model.)

*To all whom it may concern:*

Be it known that I, CHARLES H. LOEW, a citizen of the United States, residing at Cleveland, in the county of Cuyahoga and State of Ohio, have invented certain new and useful Improvements in Filtering Apparatus; and I do hereby declare that the following is a full, clear, and exact description of the invention, which will enable others skilled in the art to which it appertains to make and use the same.

My invention relates to filtering apparatus, and the invention consists in the construction substantially as shown and described, and particularly pointed out in the claim.

Figure 1:
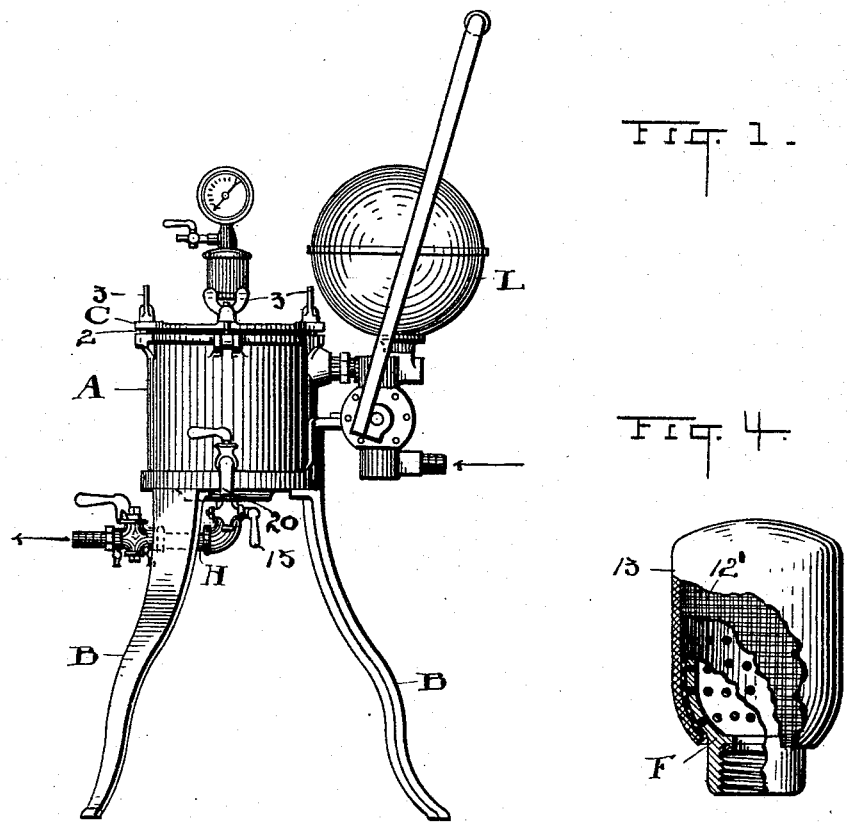
Figure 4:
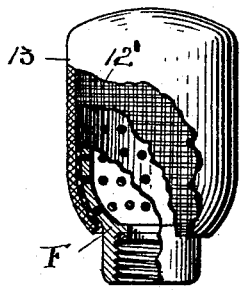
Figure 2:
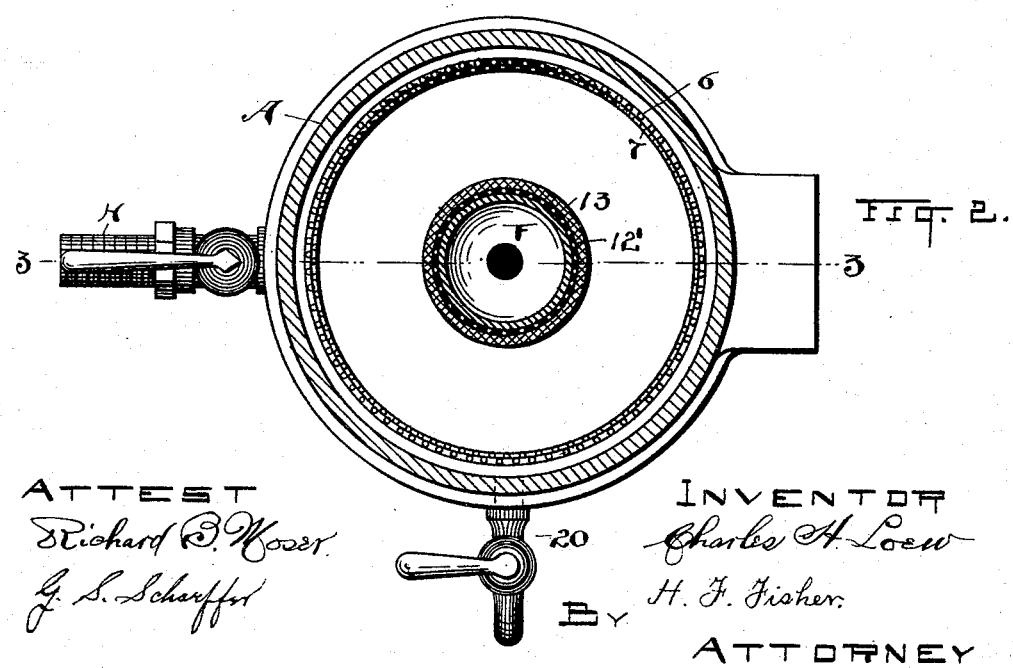

In the accompanying drawings, Figure 1 is a side elevation of my apparatus complete, and Fig. 2 is a view taken on a line corresponding to 2 2, Fig. 3, and looking downward from said line. Fig. 3 is a vertical central sectional elevation of the apparatus on a line corresponding to 3 3, Fig. 2, but omitting the pump mechanism at the right in Fig. 1. Fig. 4 is a side elevation of the inner filtering device detached from the supporting parts and partly broken away at one side to more clearly disclose the construction.

The apparatus here shown and described is designed to be used in filtering different liquids, such as water, wine, beer, and other liquids in which filtration is required or desirable.

In this apparatus I employ a suitable shell or casing A, forming a filtering-chamber and supported upon legs or standards B, or other sufficient means, according to location and use. This casing is covered with a cap C, fastened in this instance by bolts 2 and thumb-nuts 3 thereon bearing upon the said cover, a suitable gasket 4 between the cover and the edge of the casing making the joint fluid tight. By this arrangement the cover is made conveniently detachable, so as to afford access to the inside of the chamber to remove the parts for cleansing, and to cleanse or otherwise look after the interior of said chamber. The filter proper is arranged in this casing or chamber, and consists in this instance, first, of two wire-gauze tubes 6 7 sleeved closely, one within or upon the other, so as to be in effect and operation the same as a single tube. The outer tube 6 is made of the heavier wire and the inner of the lighter wire, and they are removable together. These tubes are set into the chamber A some distance apart from the wall thereof, all around, so as leave a free fluid-space about them, whereby, when the fluid is under pressure, a uniform pressure will be maintained at all points on the filtering medium inside. The bottom 8 of the casing or chamber A has a depression extending downward somewhat beneath the cylindrical wall of the casing, so as to form a fluid-space beneath the bottom of the outer filter, above described. This bottom consists of a perforated plate 9 and a sheet of wire-gauze 10 corresponding to the inner gauze 7 of the filtering-tube above described, and rests across the top of the depressed bottom 8 of the casings. The top of the outer filter consists of an upper or outer sheet 11 of perforated metal, and the inner sheet 12 of wire-gauze, the same as at the bottom of the filter. The two sheets of metal and gauze serve substantially the same purpose as the two tubes of wire-gauze forming the sides of the filter, because the outer tube 6 is made of comparatively heavy wire, so as to constitute a very firm and enduring wall, and its meshes are somewhat open, so as not to materially obstruct the flow of liquid; but it should be understood that I do not regard my invention as limited exclusively to the exact construction of the outer filter as herein described, because I might employ other material or combinations of material to do the same work. However, for many reasons, I deem the construction here shown the best, because in filtering some liquids there is need of frequent and repeated cleansing of the parts, and when this occurs they must of course be removed from the casing and cleaned, and should therefore be of material which is not liable to be broken.

It will be understood that in a full-sized filter of the character here shown and described the outer casing does not necessarily exceed ten inches in diameter, so that at best it is a small device, but has large filtering capacity. Within this outer filter is an inner filter consisting primarily of a member F having the shape of an ordinary jar inverted and threaded in its neck to make engagement with the outflow-coupling G. This part or tube F, Fig. 4, is numerously perforated about its sides and top and covered with fine wire-gauze 12 corresponding to the gauze 7 in the outer filter, and this gauze is covered with a jacket 13 of felt or porous cloth or the like. The part F might of course be of earthenware, if preferred, but it would be more liable to become broken in handling than now and also to be crushed under the pressure of the liquid unless it were very firm. Hence it is made of metal, so as to be safe and durable in service.

Within the outer filter and about the inner filter I pack the real filtering material consisting, preferably, of paper-pulp, though other equivalent material may be used, and this pulp is packed more or less densely, according to the work done. Obviously, if the material be made very compact, filtration will be retarded and slower than if it were more loosely filled in; but in any event the packing is quite close, if not, indeed, very dense and solid. The top cover of the outer filter is placed upon this packing material, and thus the material itself has the fluid-pressure from the outside directly thereon, and the said material is made subject at all points to the equal pressure of the fluid. This equality of pressure is very important for sundry reasons.

In operation the liquid passes through the first or outer filter or filtering-tubes 6 and 7, thence through the filtering medium proper, (the paper-pulp or the like,) thence through the inner filter-tube, and thence out through the coupling G and the elbow-and-pipe connection H into whatever receptacle may be provided for it.

The inner and outer filtering-tubes do, of course, serve a filtering purpose, but they each have besides a separate and distinct function apart from that of filtering. Thus the outer walls or tubes 6 and 7 are of such density as to serve to impede the direct flow of the liquid at any given point into the filtering material within, and to so retard the flow at any one point as to cause the liquid to travel elsewhere and indeed all around said wall, and thus equalize the pressure and the flow as well. The outer walls 6 and 7, therefore, form a pressure-equalizer as well as a filtering medium or element.

The inner tube or medium F is a collector or receiver of the filtered liquid, while it is also, in a sense, a filtering medium. However, I find in practice that the filtering material M packed within the outer filter wall does most of the work, and that the gauze covering over the said tube F serves more especially to keep the perforations thereof open, while the felt or like removable jacket excludes particles of the packing material from passing through. The product, therefore, is essentially clean and pure, and the result highly satisfactory in every particular.

All the several parts are provided with means for draining them when it becomes necessary to clean the filter. Thus in the bottom of the casing A there is a valved outlet 15, and in the pipe H a valved outlet 18 from the interior of the inner filter. Then, again, there is a valved outlet 20 for the outer casing at its bottom, as clearly seen in Figs. 1 and 2, so that when cleansing of the filter is required the contents can be carefully drawn off from all points through these valved outlets, the filter-casing opened by removal of the cap C, and the several parts removed to be cleaned.

I have shown on the cover of the casing a suitable indicator which at all times discloses the exact pressure of the fluid when the operation of filtering is going on. I have also shown a pump L, at the right in Fig. 1, which may be used to force the fluid through the filter; but I lay no claim to either of these mechanisms in the present application.

Having thus described my invention, what I claim as new, and desire to secure by Letters Patent, is—

The main casing and its removable cover, the open work tubes —6— and —7— within the casing sleeved upon one another and set apart from the casing to leave a free space between said parts and having a separate detached cover serving as a follower in combination with the inner perforated hollow part —F— and the discharge pipe connected with the bottom thereof, said part —F— having an open work covering —12— over its outside and the jacket —13— over said covering, the filtering media packed within the said tubes —6— and —7— and having the hollow part —E— in about the center thereof, the inlet pipe arranged to discharge into the space within casing —A— about the tubes —6— and —7— means to produce a pressure in said inlet pipe and said filter, and the outlet —15— in the bottom of the casing —A—, substantially as set forth.

Witness my hand to the foregoing specification this 7th day of December, 1894.

CHARLES H. LOEW.

Witnesses:
M. G. NORTON,
H. T. FISHER.